United States Patent [19]

Bounds

[11] Patent Number: 4,591,104

[45] Date of Patent: May 27, 1986

[54] CONDIMENT MILL

[76] Inventor: William E. Bounds, 3737 W. 240th St., Torrance, Calif. 90505

[21] Appl. No.: 646,059

[22] Filed: Aug. 30, 1984

[51] Int. Cl.$^4$ .............................................. A47J 42/08
[52] U.S. Cl. .................................. 241/169.1; 241/286
[58] Field of Search ..................... 241/168, 169, 169.1, 241/169.2, 286, 290

[56]  References Cited

U.S. PATENT DOCUMENTS 3,168,256  2/1965  Bounds et al. .................... 241/169.1
4,231,527  11/1980  Bounds ............................. 241/169.1

Primary Examiner—Mark Rosenbaum
Attorney, Agent, or Firm—Edward A. Sokolski

[57]  ABSTRACT

A condiment mill for grinding pepper, rock salt and other condiments has a base member with a grinder receptacle formed therein in which a grinder head is rotatably mounted. Also, mounted on the base member is a casing member forming a compartment for storing the condiment to be ground. A shaft extends from the grinder head and through the top of the casing member, a manipulator device for rotating the shaft being attached to the end thereof. The grinder head is resiliently retained in the base member by spring means positioned between the grinder head and the base member. This same spring means also resiliently retains the base member to the casing member; the base member thus can be manually manipulated rotatably and brought into several positions: one position for filling the compartment with condiment; another position for providing a coarse grind for the condiment and a third position for providing a fine grind for the condiment. In the last two positions, the vertical spacing between the grinder head and grinder receptacle is made different for each of such positions by means of detents formed in the base and slots formed in the lower edges of the compartment which cooperatively operate to change the grinder spacing for each of these positions.

9 Claims, 13 Drawing Figures

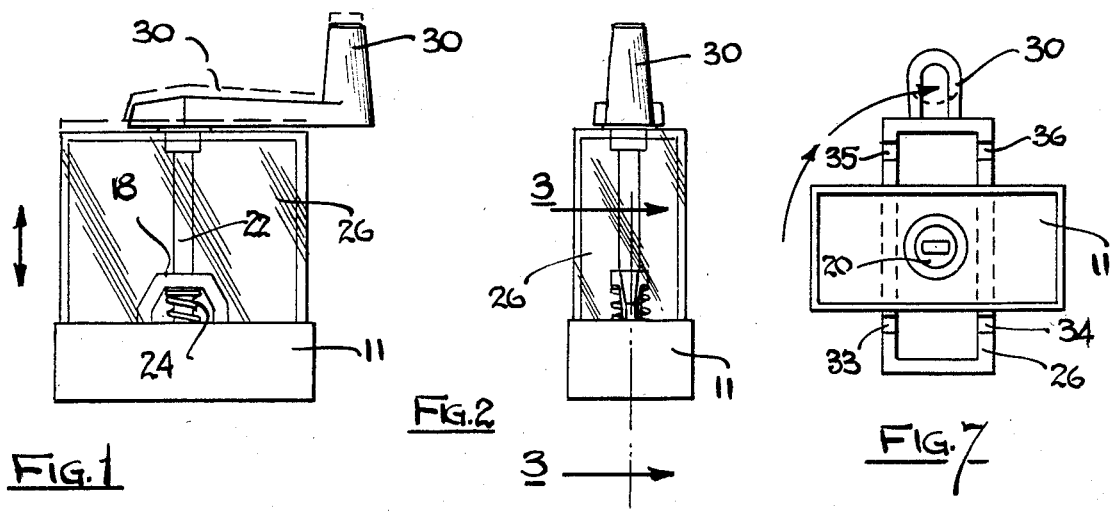
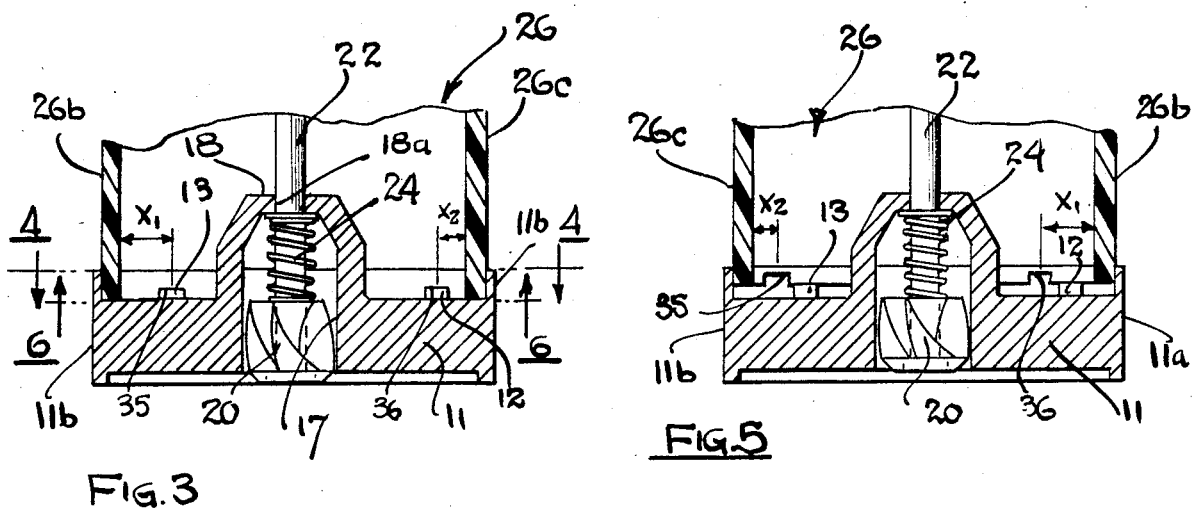
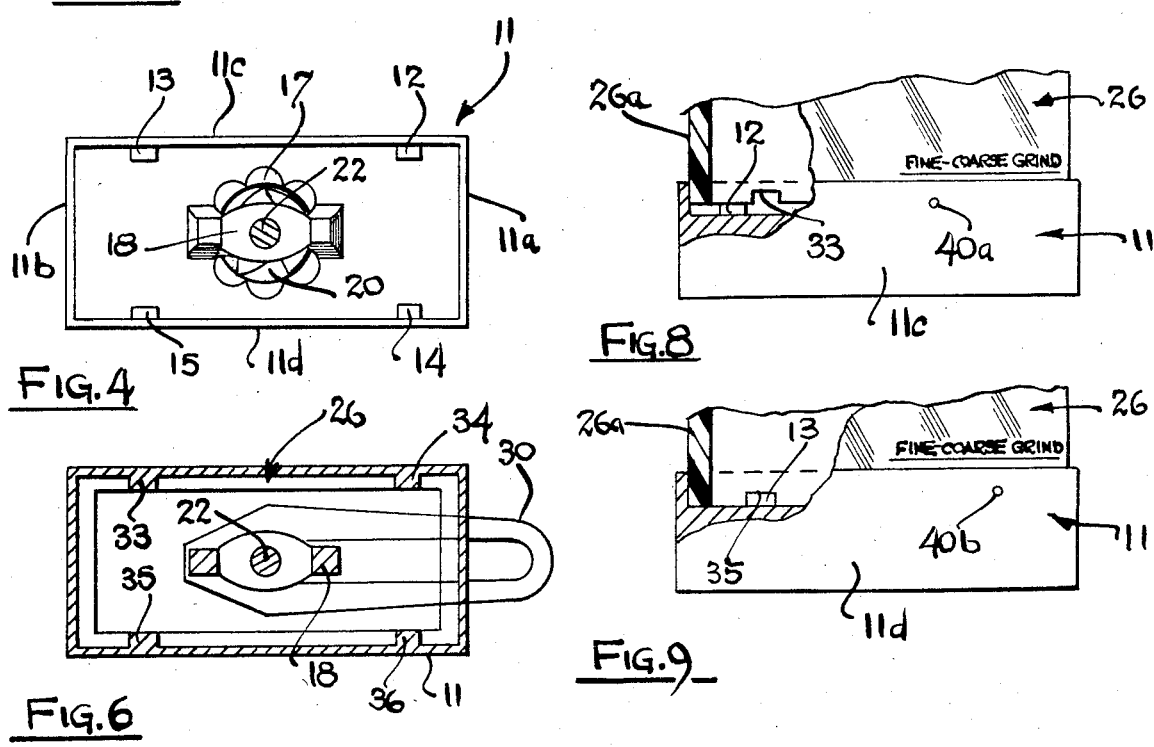

CONDIMENT MILL

This invention relates to a condiment mill and more particularly to such a device employing an adjustable grinder which can be positioned for either coarse or fine grinding.

In my U.S. Pat. No. 3,168,256 issued Feb. 2, 1965, a pepper mill is described which employs a grinder mechanism which can be selectably set to grind pepper to any one of several consistencies. The device of the present invention is an improvement over the mill of the '256 patent in that it is of simpler more economical construction and can more easily be filled with condiment than my prior art mill. The present device does not require any disassembly of the device to achieve this end result but merely a manipulation of the base member.

Briefly described the device of my invention comprises a base member which has a grinder receptacle formed therein, a grinder head being rotatably supported in the grinder receptacle. The head is supported against the resilient urging of a spring member which is positioned between the top of the grinder head and the inner top wall of the grinder receptacle. A casing member is supported on the base for rotation relative thereto, a shaft extending from the grinder head to an aperture in the top wall of the casing. A manipulator is attached to the top end of the grinder shaft to enable the rotation thereof and thus the grinding of the condiment. The base member has a plurality of detents formed therein which with the casing positioned on the base member in a first position engage slots formed in the edges of the casing which results in the positioning of the grinder head for a "fine" grinding of the condiment. With the base member rotated 180 degrees from the last mentioned position, the bottom edges of the casing rest on the detents so as to position the grinder head relative to the grinder receptacle for "coarse grind". By rotating the base relative to the casing 90 degrees from either of the aforementioned grinding positions, the interior of the casing is opened to permit the filling thereof with condiment.

It is therefore an object of this invention to provide a simpler more economical condiment grinder and dispenser.

It is a further object of this invention to provide a condiment grinder which can more easily be filled with condiment.

Other objects of my invention will become apparent as the description proceeds in connection with the accompanying drawings of which:

FIG. 1, is a side elevational view of a first embodiment of the invention;

FIG. 2, is an end elevational view of the first embodiment;

FIG. 3, is a cross-sectional view taken along the plane indicated by 3—3 in FIG. 2;

FIG. 4, is a cross-sectional view taken along the plane indicated by 4—4 in FIG. 3;

FIG. 5, is view similar to that of FIG. 3 with the grinder shown in the "fine grind" position;

FIG. 6, is a cross sectional view taken along the plane indicated by 6—6 in FIG. 3;

FIG. 7, is a bottom plan view showing the first embodiment with the base portion thereof rotated into a position for filling the casing with condiment;

FIG. 8, is a side elevational view with partial cutaway section showing the first embodiment in the "fine grind" position;

FIG. 9, is a side elevational view with partial cutaway section showing the first embodiment of the mill in "coarse grind" position;

Figure 10:
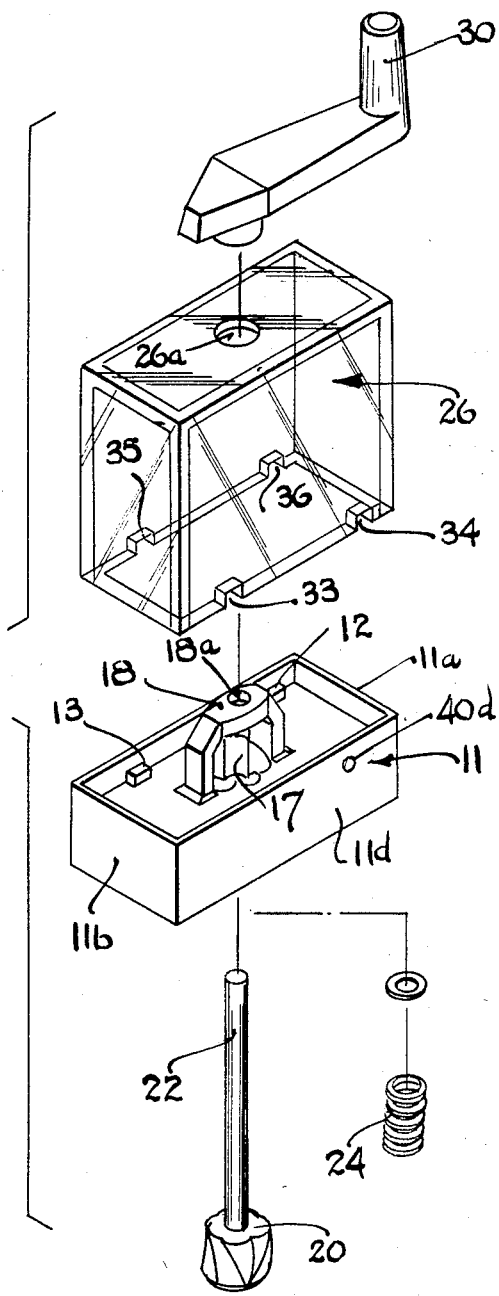
FIG. 10, is an exploded view of the first embodiment.

Referring now to the drawings, a first embodiment of the invention is illustrated. Base member 11 has four detents 12–15 formed along the edges thereof, detents 12 and 14 being opposite each other and closer to end wall 11a of the base than oppositely position detents 13 and 15 are to end wall 11b of the base. A grinder receptacle 17 is formed substantially in the center of the base. Extending upwardly from grinder receptacle 17 is a bracket member 18 having a aperture 18a formed therein. Rotatably mounted in grinder receptacle 17 is grinder head 20. Grinder head 20 and grinder receptacle 17 may be of the type described in my aforementioned U.S. Pat. No. 3,168,256 or may be any other suitable adjustable grinder mechanism wherein vertical adjustment between the head and the receptacle changes the consistency of the ground condiment.

Fixedly attached to grinder head 20 is grinder shaft 22 which extends through aperture 18a of bracket 18. Coil spring 24 is positioned around shaft 22 between the top surface of grinder head 20 and the inside wall of bracket 18, this spring being normally compressed. Mounted on base 11 is a rectangular casing 26 which may be of a rigid transparent material such as a suitable plastic and provides a container for the condiment. The casing has two pairs of opposite side walls a top wall, and an open bottom portion. Shaft 22 extends through an aperture 26a formed in the top wall of the casing. A grinder crank 30 is attached to the top end of shaft 22 and is employed for rotating the shaft.

Casing 26 is resiliently retained to base 11 by virtue of the downward action of spring 24 on grinder head 20, this action being transferred through shaft 22 to crank 30 which abuts against the top surface of casing 26. The base thus can be rotated relative to the casing by manually pulling the base away from the casing along shaft 22 so as to free the sides of these two members from each other.

Paired opposing slots 33, 34 and 35, 36 are formed along the bottom edges of casing 26. As shown in FIGS. 3 and 5, the centerlines of slots 33 and 34 are spaced from the inside surface of side 26b of the casing by a distance "$x_1$" while paired slots 35 and 36 are spaced from the inside surface of wall 26c by a distance "$x_2$". Similarly in the position of FIG. 3, the centerlines of detents 12 and 14 are spaced from the inside wall of side 26c by a distance "$x_2$" while the center line of detents 13 and 15 are spaced from the inside wall of side 26b by a distance "$x_1$". Thus it will be apparent that when base member 11 is positioned relative to casing 26 as shown in FIGS. 3 and 9, slots 33–36 will be positioned in mating engagement over corresponding detents 12–15 bringing the casing to a lower position relative to base 11 and so also bringing grinder head 20 to a lower position relative to grinder receptacle 17, this being the position for "coarse grind". With the base 11 rotated 180 degrees from the position of FIG. 3 to that shown in FIGS. 5 and 8, the detents 12–15 will no longer ride in slots 33–36 but rather will abut against the bottom edges of casing 26. This brings the casing to a higher position relative to base 11, thus bringing grinder head 20 to the higher position indicated in FIGS. 5 and 8 which makes for "fine grind". An indicator 40a is provided on one side 11c of base 11 to indicate fine grind while a second indicator 40b is provided on the opposite side 11d of base 11 to indicate "coarse grind", the indicia "fine-coarse grind" being placed on only one side of casing 26. This provides a simple indicator mechanism.

As can be seen in the exploded view of FIG. 10, the device of the invention consists of only a few parts which can be very easily assembled and disassembled. This simplicity not only contributes to economy but also to reliability of operation.

As shown in FIG. 7 the device can be loaded with condiment by holding it upside down and rotating base 11 ninety degrees relative to casing 26. Once filled with condiment, the base need only be rotated 90 degrees back into position for either coarse or fine grind as may be desired.

It should be apparent that to achieve the same operation, the detents 12–15 can be formed on the casing member rather than the base while the slots 33–36 can be formed on the base rather than the casing.

Figure 11:
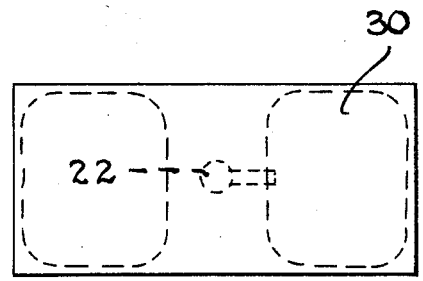
FIG. 11, is a top plan view of a second embodiment of the invention.
Figure 12:
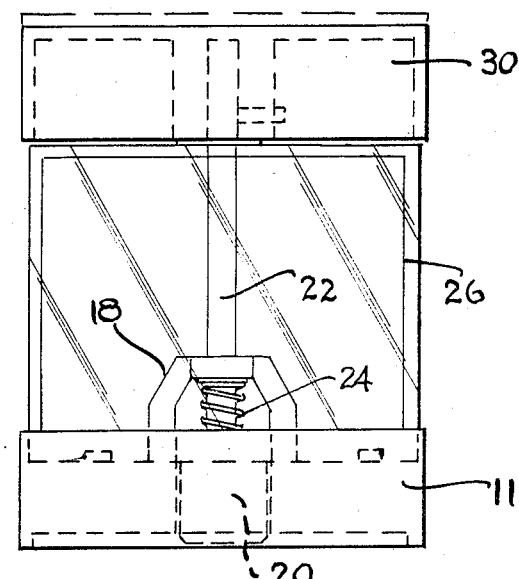
FIG. 12, is a side elevational view of the second embodiment.
Figure 13:
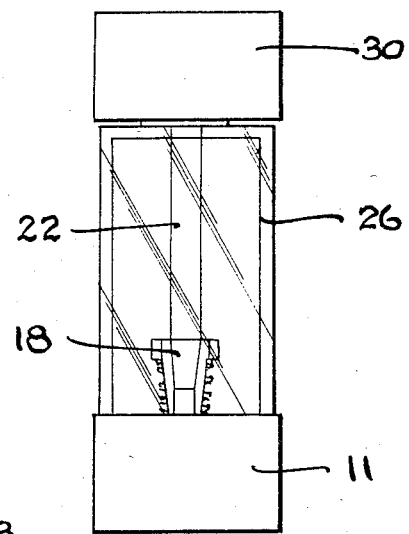
FIG. 13, is an end elevational view of the second embodiment.

Referring now to FIG. 11 a second embodiment of the invention is illustrated. This embodiment is the same as the first except for the grinder manipulator 30 which in this instance is of a rectangular shape similar to the shape of base 11.

While the invention has been described and illustrated in detail, it is to be clearly understood that this is intended by way of illustration and example only and is not to be taken by way of limitation, the spirit and scope of the invention being limited only by the terms of the following claims.

I claim:

1. A mill for grinding condiment comprising;
   a base member having a grinder receptacle formed therein,
   a grinder head rotatably mounted in said grinder receptacle,
   a casing member mounted on said base member,
   a shaft attached to the grinder head, one end of the shaft extending through a wall of the casing member,
   manipulator means attached to said one end of said shaft for rotating the shaft and grinder head relative to the grinder receptacle to grind the condiment, and
   spring means mounted between the grinder head and the base member for resiliently urging the grinder head towards the receptacle and resiliently retaining the base member to the casing member,
   there being mating detent and slot means formed on said casing and said base members for alternatively bringing the grinder head to a first position axially relative to the grinder receptacle for coarse grinding or a second position axially relative to the grinder receptacle for fine grinding, the casing and base members being rotatable one hundred eighty degrees relative to each other in going between said first and second positions, and being rotatable to a third position between the first and second positions for filling the casing member with condiment.

2. The mill of claim 1 wherein the manipulator means comprises a grinder crank.

3. The mill of claim 1 wherein the manipulator means comprises a rectangular member.

4. The mill of claim 1 wherein the spring means comprises a coil spring mounted on said shaft.

5. The mill of claim 1 and further comprising markers on opposite sides of said base member positioned to indicate "coarse" and "fine" grind respectively and an indicia of "coarse and fine" grind on one side of said casing member to indicate in conjunction with said markers the grind to which the mill is set.

6. The mill of claim 1 wherein the casing member has two pairs of opposite side walls, a top wall and an open bottom portion.

7. The mill of claim 6 wherein the detent and slot means comprises a plurality of detents formed on said base member and a like number of mating slots formed along the edge of the bottom portion of the casing member, said detents fitting into said slots in one of said first or second positions and abutting against said edge of he casing member in the other of said first or second positions.

8. The mill of claim 7 wherein there are two pairs of oppositely positioned detents and two pairs of oppositely positioned slots.

9. The mill of claim 8 wherein the detents fit into the slots in said first position and abut against the edge of the casing member in said second position.

* * * * *